Figure 1:
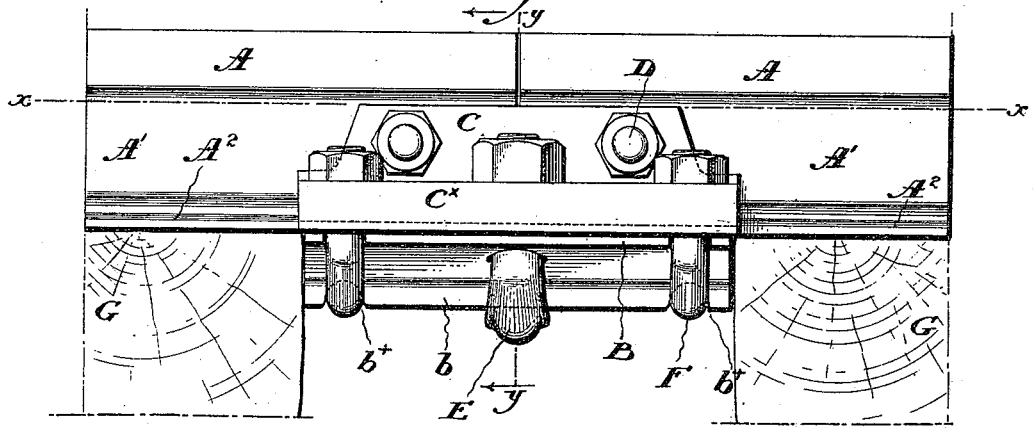

(No Model.)

C. FISHER.
RAIL JOINT.

No. 466,095. Patented Dec. 29, 1891.

WITNESSES:
F. N. Dixon
J. H. Morris

INVENTOR:
Clark Fisher
By his Attorneys,
Wm. C. Strawbridge
J. Bonsall Taylor

UNITED STATES PATENT OFFICE.

CLARK FISHER, OF TRENTON, NEW JERSEY.

RAIL-JOINT.

SPECIFICATION forming part of Letters Patent No. 466,095, dated December 29, 1891.

Application filed June 17, 1891. Serial No. 396,555. (No model.)

*To all whom it may concern:*

Be it known that I, CLARK FISHER, a citizen of the United States, residing at Trenton, in the county of Mercer and State of New Jersey, have invented certain new Improvements in Rail Joints, of which the following is a specification.

Rail joints are either supported, or suspension, joints. In supported joints the abutting rail ends are directly supported underneath, either by a tie upon which is superimposed a metal plate or chair upon which the two rail ends rest, or else by a plate or beam long enough to span the interval between the two ties, the point of abutment of the two rails being midway of its length and the construction being characterized by the term "bridge-joint." In suspension joints the abutting rail ends receive no external support vertically, each end projecting beyond its last tie and the two ends being connected together in the region of the interval between adjacent ties by a device in the nature of a fish joint or so-called fishing device. In all suspension joints the vertical stiffness of one overhanging rail end is sought to be combined with that of the other, in order that together the two may possess a strength approximating that of the continuous or solid portion of the rail. It will therefore be apparent that the essential distinction between supported and suspension joints lies in the fact that the suspension joint is not independently supported underneath at the region of the abutting rail ends, whereas the supported joint is.

My invention relates to the class of suspension joints, and it consists, essentially, in fishing the abutting rail ends by the use of three fish bars, one, which I term the lower bar, being hung beneath the base of the rails and acting by means of suitable bolts and nuts only in a vertical direction and the two other of which, which I term the upper bars, being respectively placed upon the respective sides of the stems of the abutting rail ends and being of such sectional shape as to come into close contact with the upper surfaces of the rail flanges or bases, and against the vertical stems of the rails a little short of contact with the rail heads, so as to act simultaneously in both a horizontal and a vertical direction. Horizontal bolts through the vertical members of these upper fish-bars and through the rail-stems and vertical bolts through the horizontal members of said fish bars, and through the lower fish bars, together with the inclosed rail flanges or bases constitute a double fishing connection, or triple fish bar device, and a combination in which all of the surfaces of the bases and rail stems below the heads are in close contact throughout with the opposing surfaces of the three fishing bars, and are maintained in contact by both horizontal and vertical fish-bar bolts armed with the nuts required to fit them to resist the usual strains.

In all fishing devices prior to mine, reliance has been placed upon side bars whose longitudinally-extending upper and lower edges have been closely fitted in and against the lower surfaces of the heads of the rails, as well as upon the upper surfaces of the rail-flanges, the bars not having been fitted against the stem, any contact with which has been unnecessary because dependence has been placed solely upon the contact referred to between the heads and the flanges. The longitudinal edges of the side bars have, moreover, been slightly angled transversely to permit of the drawing of the bars together by the horizontal bolts which held them to duty, whenever complete contact and perfect fitting of the bars with respect to the heads and flanges happened to become impaired by wear.

In a rail joint embodying my invention the upper fish-bars are of less height than the rail stems, and consequently intentionally out of contact along their upper edges with the under surfaces of the rail heads, and reliance for the fishing action is placed solely upon the inclosure of the lower portion of the rails, that is of the stem and flanges, which are inclosed by three bars, none of which are required to, or in fact do, make contact with any part of the rail-heads.

A rail joint embodying my improvements is represented in the accompanying drawings and hereinafter described, the particular subject matter claimed as novel being hereinafter definitely specified.

Figure 2:
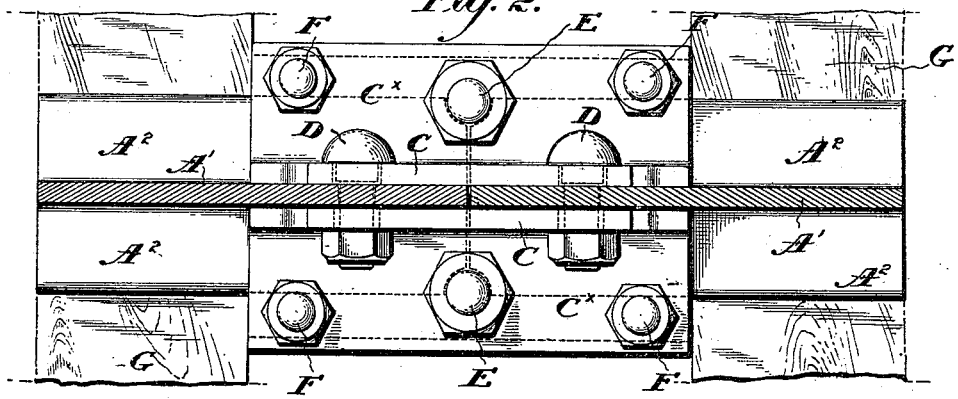

Figure 1 is a side elevation of a rail joint embodying my improvements; Fig. 2 is a plan view of the joint shown in Fig. 1, sectional through the rail stems in the plane of the dotted line x x upon said view; and Fig. 3 is a transverse sectional elevation through the joint shown in Fig. 1 in the plane of the dotted line y y of said Fig. 1, one of the rail ends being represented in end elevation and the central U-bolt similarly in elevation.

Similar letters of reference indicate corresponding parts.

In the drawings A A represents the rail heads of the abutting ends of two rails; A' A' the rail stems; and $A^2 A^2$ the rail bases. The rails are of the usual form.

Figure 3:
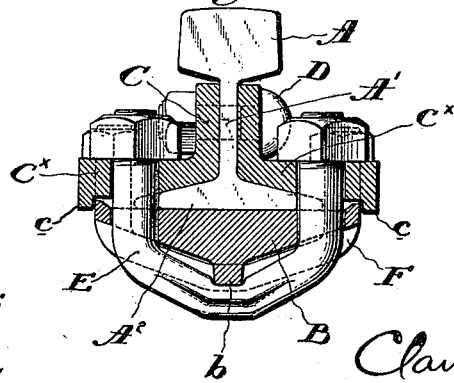

B is the lower fish bar, conveniently made of the form shown in Figs. 1 and 3, that is to say, of a maximum depth along its central longitudinal under portion, or that portion which extends longitudinally directly beneath the stem of the rail ends and is therefore coincident with the lines of vertical strains. I have designated this deeper portion as a rib $b$; but the increased depth of the center as compared with the sides may be secured by graduating the depth or thickness, instead of by forming an actual rib.

The upper fish bars I have designated as to their vertical members by the letter C, and as to their horizontal members by $C^x$. The height of the vertical members is, as shown in the drawings, less than the height of the rail stems, so that the bars do not make contact with the under surfaces of the rail heads. The horizontal members of these upper bars I have extended laterally so that they respectively overlap the lateral edges of the under fish-bar B, and have provided them with down-turned longitudinal flanges $c$ which augment the bending strength of the bars at their outer edges where it is mainly required, and which also serve as a guide for the under bar.

D D are horizontal bolts which pass through the vertical members of the upper fish-bars and the rail stems, and serve to bring together said upper fish bars against said stems so as to make a solid contact throughout the opposing surfaces, and firmly clasp the stems between the bars.

E is a central U-bolt, and F F two supplemental U-bolts, which together serve most conveniently and securely to combine the lower fish-bar with the upper fish-bars and the rail flanges, for fishing the joint vertically. The heads of each of these U-bolts are transversely to the run of the rails, and as the strain is greatest at the extremities of the abutting rail ends, the central bolt is made larger than the supplemental or end bolts, and in order to bring its force nearer to the stems it passes through a space between the lower and the upper fish-bars, the abutting corners of the rail flanges being notched out. The central U-bolt passes across and beneath the thickened basal portion of the lower fish bar, and the heads of the supplemental bolts preferably pass through notches $b^x$ in said portion. Inasmuch as the lower fish-bar in my fish joint is suspended between the ties G, and does not rest as to any part upon them, it will be obvious that there will be a thrust of its ends against the side of the ties by the passing of trains, which is commonly known as the creeping of the track. The depth of the bar is however such that ample area at its ends is presented against adjacent ties to resist the thrust and prevent creeping.

Having thus described my invention, I claim and desire to secure by Letters Patent:

1. The combination to form a suspension rail-joint, of two rail ends, a pair of counterpart upper fish-bars the respective horizontal members of which fit and bear down upon the rail flanges and the respective vertical members of which bear against the rail stems, a lower fish-bar which fits against the under surfaces of the rail flanges, horizontal bolts which pass through and clamp together the vertical members of the upper fish-bars and the rail stems, and transversely arranged U-bolts which clamp together the horizontal members of the upper fish-bars the lower fish-bar and the rail flanges, substantially as and for the purposes set forth.

2. The combination to form a suspension rail-joint, of two rail ends, a pair of counterpart upper fish-bars the respective horizontal members of which fit and bear down upon the rail flanges, and the respective vertical members of which bear against the rail stems, a lower fish-bar which fits against the under surfaces of the rail flanges and is formed with a central longitudinally extending thickened portion, horizontal bolts which pass through and clamp together the vertical members of the upper fish-bars and the respective rail stems, and a central U-bolt and end U-bolts which clamp together the horizontal members of the upper fish-bars the lower fish-bar and the rail flanges, substantially as set forth.

In testimony that I claim the foregoing as my invention I have hereunto signed my name this 9th day of June, A. D. 1891.

CLARK FISHER.

In presence of—
 FRANKLIN HENDRICKSON,
 JOHN H. KEMPTON.